United States Patent
Hasse et al.

(10) Patent No.: US 6,626,980 B2
(45) Date of Patent: Sep. 30, 2003

(54) MIXED MATRIX MEMBRANES INCORPORATING CHABAZITE TYPE MOLECULAR SIEVES

(75) Inventors: David J. Hasse, Bel Air, MD (US); Sudhir S. Kulkarni, Wilmington, DE (US); David R. Corbin, West Chester, PA (US); Aspi N. Patel, Newark, DE (US)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/960,423

(22) Filed: Sep. 21, 2001

(65) Prior Publication Data

US 2003/0089227 A1 May 15, 2003

(51) Int. Cl.[7] .................................................. B01D 53/22
(52) U.S. Cl. ........................ 95/51; 95/45; 95/54; 96/4; 96/14
(58) Field of Search .............................. 95/45, 51, 53, 95/54; 96/4, 10, 14

(56) References Cited

U.S. PATENT DOCUMENTS

| | | | |
|---|---|---|---|
| 3,030,181 A | * | 4/1962 | Milton |
| 4,440,871 A | | 4/1984 | Lok et al. ................... 502/214 |
| 4,503,023 A | * | 3/1985 | Breck et al. |
| 4,544,538 A | | 10/1985 | Zones ....................... 423/326 |
| 4,925,459 A | | 5/1990 | Rojey et al. .................. 155/16 |
| 4,925,562 A | | 5/1990 | te Hennepe et al. ..... 210/500.25 |
| 4,973,606 A | | 11/1990 | Sterzel et al. ................. 521/27 |
| 5,104,425 A | * | 4/1992 | Rao et al. ....................... 55/16 |
| 5,127,925 A | | 7/1992 | Kulprathipanja et al. ....... 55/16 |
| 5,520,720 A | * | 5/1996 | Lemcoff .................. 95/138 X |
| 5,753,121 A | * | 5/1998 | Geus et al. .................. 96/4 X |
| 5,772,735 A | * | 6/1998 | Sehgal et al. .................. 95/45 |
| 5,810,910 A | * | 9/1998 | Ludwig et al. ............... 95/138 |
| 5,858,068 A | * | 1/1999 | Lansbarkis et al. ....... 95/138 X |
| 5,968,366 A | * | 10/1999 | Deckman et al. .......... 95/45 X |
| 5,980,611 A | * | 11/1999 | Kumar et al. ............ 95/139 X |
| 6,387,269 B1 | * | 5/2002 | Eltner et al. ................ 210/640 |

FOREIGN PATENT DOCUMENTS

| GB | 868846 | * | 5/1961 |
|---|---|---|---|

* cited by examiner

*Primary Examiner*—Robert H. Spitzer
(74) *Attorney, Agent, or Firm*—Jeffrey C. Law; Linda Russell

(57) ABSTRACT

A device useful for separating the components of gas mixtures includes a selectively gas permeable mixed matrix membrane of a dispersed phase of chabazite type molecular sieve particles uniformly distributed throughout a continuous phase of a polymer. The membrane can be fabricated by dispersing the chabazite type molecular sieve particles in a solution of the polymer dissolved in a suitable solvent, and then forming the suspension into a membrane structure by conventional polymer membrane fabrication techniques. Mixed matrix membranes with chabazite type molecular sieves are well suited to separations of oxygen, carbon dioxide or helium from nitrogen or methane.

11 Claims, No Drawings

MIXED MATRIX MEMBRANES INCORPORATING CHABAZITE TYPE MOLECULAR SIEVES

FIELD OF THE INVENTION

This invention relates to mixed matrix gas separation membranes incorporating a molecular sieve dispersed in a polymer, and more specifically, to such mixed matrix membranes in which the molecular sieve has a chabazite crystal structure.

BACKGROUND OF THE INVENTION

The use of selectively gas permeable membranes to separate the components of gas mixtures is a well developed and commercially very important art. Such membranes are traditionally composed of a homogeneous, usually polymeric composition through which the components to be separated from the mixture are able to travel at different rates under a given set of driving force conditions, e.g. transmembrane pressure and concentration gradients.

A relatively recent advance in this field utilizes mixed matrix membranes. Such membranes are characterized by a heterogeneous, active gas separation layer comprising a dispersed phase of discrete particles in a continuous phase of a polymeric material. The dispersed phase particles are microporous materials that have discriminating adsorbent properties for certain size molecules. Chemical compounds of suitable size can selectively migrate through the pores of the dispersed phase particles. In a gas separation involving a mixed matrix membrane, the dispersed phase material is selected to provide separation characteristics which improve the permeability and/or selectivity performance relative to that of an exclusively continuous phase polymeric material membrane.

Previous research on mixed matrix membranes with enhanced selectivity has suggested the use of zeolites for the dispersed phase particles. Some types of zeolites identified for use in mixed matrix membranes include: MFI type, such as silicalite, LTA types 4A and 5A, and FAU types X and Y with various substituted cations. Further understanding of conventional use of zeolites in mixed matrix membranes may be understood with reference to the following patents:

U.S. Pat. No. 5,127,925 (Kulprathipanja et al.) describes a process for separating a first gas component from a feed gas mixture calling for contacting the mixture with a mixed matrix membrane of an organic polymer having an adsorbent incorporated therein. The adsorbent material is selected from among zeolites such as crystalline aluminosilicates, silicalite, inorganic oxides, activated carbon or ion exchange resin.

U.S. Pat. No. 4,925,562 (te Hennepe et al.) discloses a pervaporation process which employs a membrane comprising an elastomeric polymer matrix containing zeolite. In a preferred embodiment, the elastomeric polymer matrix is silicone rubber comprising a polysiloxane. Preferred zeolites include hydrophobic aluminosilicates with a high Si/Al ratio. Silicalite is disclosed as a suitable zeolite.

U.S. Pat. No. 4,925,459 (Rojey et al.) discloses a gas separation membrane comprising an active layer including particles of a selective solid dispersed in a continuous non-porous and non-elastomeric polymer phase and a porous support. Rojey et al. teach that zeolites are particularly adapted for use in the dispersed phase.

Although gas separation membrane technology has steadily advanced, it is a persistent general shortcoming of polymeric membranes that usually either high transmembrane flux or high selectivity can be obtained at sacrifice of the other. The advent of mixed matrix membranes provided the ability to better design a membrane to achieve optimum performance by using two permeable materials with different flux and selectivity characteristics. The patents referred to above explain that zeolites may be used for the dispersed phase material of mixed matrix membranes. Despite this knowledge, zeolite-containing mixed matrix gas separation membranes have previously not provided the desirable combination of both high flux and selectivity for many common gas separation applications such as separating oxygen, nitrogen, carbon dioxide, hydrogen, helium or methane from mixtures comprising such gases.

Many traditional zeolite mixed matrix membranes also suffer from the drawback that condensable impurities in the gases being separated, such as water, adversely affect transfer of gases through the zeolite. That is, the flux and/or selectivity of zeolite-containing mixed matrix membranes utilized for gas mixtures containing water vapor usually decrease significantly after such exposure to the condensible-bearing gases. Moreover, the decrease in separation performance parameters persists even after steps are taken to dry the membrane.

It remains highly desirable to provide a mixed matrix gas separation membrane having molecular sieve dispersed in a continuous polymer matrix which can yield a combination of higher flux and selectivity than has heretofore been attainable. It is also desired to provide a molecular sieve-containing mixed matrix membrane which can maintain high flux and selectivity after exposure to gas mixtures containing water vapor.

SUMMARY OF THE INVENTION

Accordingly, the present invention now provides a mixed matrix gas separation membrane comprising particles of CHA type molecular sieve dispersed in a continuous phase consisting essentially of a polymer.

There is also provided a process for separating at least one component gas from a mixture comprising the component gas, the process comprising the steps of (A) providing a mixed matrix gas separation membrane comprising particles of CHA type molecular sieve dispersed in a continuous phase consisting essentially of a polymer which is permeable to the component gas, (B) contacting the mixture on one side of the membrane to cause the component gas to permeate the membrane, and (C) removing from the opposite side of the membrane a permeate gas composition comprising a portion of the component gas which permeated the membrane.

DETAILED DESCRIPTION

This invention pertains to mixed matrix membranes. By "mixed matrix" is meant that the membrane has a selectively gas permeable layer which comprises a continuous phase of a polymeric material and discrete particles of adsorbent material uniformly dispersed throughout the continuous phase. These particles are collectively sometimes referred to herein as the "discrete phase" or the "dispersed phase". Thus the term "mixed matrix" is used here to designate the composite of discrete phase particles dispersed within the continuous phase.

The adsorbent material utilized in the present invention is a type of molecular sieve. Molecular sieves exist in both natural and synthetic forms. They are well known in the art to encompass an extensive variety of species and are described in *Atlas of Zeolite Structure Types* W. M. Meier, D. H. Olson and Ch. Baerlocher, Zeolites 1996, 17 (A1–A6), 1–230 (hereinafter "IZA"), in *Molecular Sieves: Principles of Synthesis and Identification*, R. Szostak, Van Nostrand Reinhold, (1989), and in *Zeolite Molecular Sieves*, D. Breck, John Wiley and Sons, 1973, (Breck), the complete disclosures of which are hereby incorporated herein by reference. Molecular sieves have framework structures which may be characterized by distinctive wide-angle X-ray diffraction patterns. Zeolites are a subclass of molecular sieves based on an aluminosilicate composition. Non-zeolitic molecular sieves are based on other compositions such as aluminophosphates, silico-aluminophosphates and silica. Molecular sieves of different chemical compositions can have the same framework structure.

Zeolites can be further broadly described as molecular sieves in which complex aluminosilicate molecules assemble to define a three-dimensional framework structure enclosing cavities occupied by ions and water molecules which can move with significant freedom within the zeolite matrix. In commercially useful zeolites, the water molecules can be removed from or replaced without destroying the framework structure. Zeolite composition can be represented by the following formula: $M_{2/n}O \cdot Al_2O_3 \cdot xSiO_2 \cdot yH_2O$, wherein M is a cation of valence n, x is greater than or equal to 2, and y is a number determined by the porosity and the hydration state of the zeolites, generally from 0 to 8. In naturally occurring zeolites, M is principally represented by Na, Ca, K, Mg and Ba in proportions usually reflecting their approximate geochemical abundance. The cations M are loosely bound to the structure and can frequently be completely or partially replaced with other cations or hydrogen by conventional ion exchange. Acid forms of molecular sieve sorbents can be prepared by a variety of techniques including ammonium exchange followed by calcination or by direct exchange of alkali ions for protons using mineral acids or ion exchangers. For a discussion of acid sites in zeolites see J. Dwyer, "Zeolite, Structure, Composition and Catalysis" in Chemistry and Industry, Apr. 2, 1984.

The zeolite framework structure has corner-linked tetrahedra with Al or Si atoms at centers of the tetrahedra and oxygen atoms at corners. Such tetrahedra are combined in a well-defined repeating structure comprising various combinations of 4-, 6-, 8-, 10-, and 12-membered rings. The resulting framework structure is one of regular channels and cages, which has a pore network that is useful for separation. Pore dimensions are determined by the geometry of the aluminosilicate tetrahedra forming the zeolite channels or cages, with nominal openings of 0.26 nm for 6-member rings, 0.40 nm for 8-member rings, 0.55 nm for 10-member rings and 0.74 nm for 12-member rings (these numbers assume ionic radii for oxygen). Those skilled in the art will recognize that zeolites with the largest pores being 8-member rings, 10-member rings, and 12-member rings are considered small, medium, and large pore zeolites, respectively. Pore dimensions are critical to the performance of these materials in catalytic and separation applications, since this characteristic determines whether molecules of certain size can enter and exit the zeolite framework. In practice, it has been observed that very slight decreases in ring dimensions can effectively hinder or block movement of particular molecular species through the zeolite structure.

The effective pore dimensions that control access to the interior of the zeolites are determined not only by the geometric dimensions of the tetrahedra forming the pore opening, but also by the presence or absence of ions in or near the pore. For example, in the case of zeolite type A, access can be restricted by monovalent ions, such as $Na^+$ or $K^+$, which are situated in or near 8-member ring openings as well as 6-member ring openings. Access can be enhanced by divalent ions, such as $Ca^{2+}$, which are situated only in or near 6-member ring openings. Thus, the potassium and sodium salts of zeolite A exhibit effective pore openings of about 0.3 nm and 0.4 nm respectively, whereas the calcium salt of zeolite A has an effective pore opening of 0.5 nm. The presence or absence of ions in or near the pores, channels, and/or cages can also significantly modify the accessible pore volume of the zeolite for sorbing materials.

Thus the KA zeolite (also known as 3A) allows a constituent whose molecule has a size less than 3 Å (0.3 nm, 1 Å=$1 \times 10^{-10}$ m) to be separated from a constituent whose molecule has a size greater than 3 Å (0.3 nm). For example, KA zeolite therefore allows separation of water which can enter the pores of the zeolite from methane which is excluded. Similarly, NaA zeolite (also known as 4A) allows a constituent whose molecule has a size less than 4 Å (0.4 nm) to be separated from a constituent whose molecule has a size greater than 4 Å (0.4 nm), and CaA zeolite, (also known as 5A) allows normal paraffins to be separated from a mixture of normal paraffins and isoparaffins.

Representative examples of zeolites are small pore zeolites such as NaA, CaA, Erionite, Rao, ZK-5 and chabazite; medium pore zeolites such as ZSM-5, ZSM-11, ZSM-22, and ZSM-48, and large pore zeolites such as zeolite beta, zeolite L, NaX, NaY, and CaY.

The silicon/aluminum atomic ratio of a given zeolite can vary over a wide range. For example, zeolite X can be synthesized with silicon/aluminum atomic ratios of from 1 to 1.5; and zeolite Y, from 1.5 to about 3. In some molecular sieves, such as MFI type, the upper limit of the silicon/aluminum atomic ratio is unbounded. ZSM5 is one such example wherein the silicon/aluminum atomic ratio is at least 12. Low alumina-containing zeolites also can be prepared synthetically or by modification of high alumina-containing zeolites using methods well known in the art. These methods include but are not limited by treatment using $SiCl4$ or $(NH_4)_2SiF_6$ as well as steaming followed by acid treatment. The $SiCl_4$ treatment is described in J. Chem. Ed. 67(6), 519–521, 1990. The $(NH_4)_2SiF_6$ treatment by Breck et al., is described in U.S. Pat. 4,503,023. These treatments are generally very effective at increasing the Si/Al ratio for zeolites such as zeolites Y and mordenite.

Another class of molecular sieves is characterized by $AlO_2$ and $PO_2$ units ($AlPO_4$ or aluminum phosphates) of which at least some Al or P constituents optionally may be substituted by other elements such as Si (called silicoaluminophosphates or SAPO's), or metals (called metalloaluminophosphates or MeAPO's) or combinations thereof (called metalloalumino-phosphosilicates or MeAPSO's). These $AlPO_4$, SAPO, MeAPO, and MeAPSO materials are crystalline and have ordered pore structures which accept certain molecules while rejecting others.

The type of molecular sieves used in the mixed matrix membrane of this invention is iso-structural with the mineral zeolite known as chabazite. That is, they are characterized by the chabazite framework structure designated as CHA by the IZA reference. This molecular sieve type derives its name from the structure of a naturally occurring mineral with the approximate unit cell formula $Ca_6Al_{12}Si_{24}O_{72}$. The chabazite type (CHA) molecular sieves are distinguished by channels based on 8-member rings with about 3.8 Å×3.8 Å (0.38 nm×0.38 nm) dimensions.

Identification of chabazite is generally made by X-ray powder diffraction. A number of synthetic molecular sieves generate the characteristic diffraction pattern of CHA type and therefore are reported (for example, in the IZA reference and Szostak, cited above) to have the same CHA framework structure as (or are iso-structural with) the mineral chabazite.

The integrated intensities of the observed X-ray peaks can be used as a measure of molecular sieve crystallinity. High intensities indicate a highly crystalline material. However, as crystallite size falls below about 50 nm, X-ray diffraction peaks broaden (H. P. Klug and L. E. Alexander, X-Ray Diffraction Techniques, Wiley-Interscience, N.Y., 1974). When crystallite size falls below about 2–6 nm, peaks become so broad that they are difficult to detect by conventional analog recording spectrometers. Despite a lack of measurable X-ray peak intensity, such "X-ray amorphous" zeolite crystallites are capable of shape selective catalysis, as recently reported by Jacobs et al., J. Chemical Society, Chemical Communications, p. 591 (1981). For such crystallites, molecular sieve crystallinity is evident from infra-red spectra, sorption measurements, and catalytic shape selectivity. The CHA molecular sieve materials of the present invention can be highly crystalline, poorly crystalline, or X-ray amorphous crystallites. Thus the term "chabazite" herein is intended to encompass any molecular sieves which exhibit the characteristic X-ray diffraction pattern of the CHA structure or can be identified as CHA type by infra-red spectra, sorption measurements and/or catalytic shape selectivity.

Various synthetic forms of CHA type molecular sieves are known. Several CHA type zeolites described by Breck are Zeolite "K-G", a potassium form having a silica:alumina mole ratio of 2.3:1 to 4.15:1, reportedly described in J. Chem Soc., p. 2822 (1956), Barrer et al; Zeolite D, a sodium-potassium form having a silica:alumina mole ratio of 4.5:1 to 4.9:1, reportedly described in British Patent No. 868,846 (1961); and Zeolite R, a sodium form which has a silica:alumina mole ratio of 3.45:1 to 3.65: 1, reportedly described in U.S. Pat. No. 3,030,181 (1962). A pure $SiO_2$ chabazite type molecular sieve is described by Cabanas et al. *Synthesis and structure of pure $SiO_2$ chabazite*, Chem. Commun. 1998, 1881–2. Willhendersonite is identified as a CHA type molecular sieve by Lengauer et al., *Dehydration and structural transformation in the chabazite-type zeolite Willhendersonite*, Eur. J. Miner. 1999 Bh. 1, 144. The disclosures of these sources is hereby incorporated herein by reference.

Additional illustrative examples of CHA type molecular sieves suitable for use in this invention include SSZ-13, H-SSZ-13, Na-SSZ-13, SAPO-34, and SAPO-44. SSZ-13 is an aluminosilicate molecular sieve material prepared as disclosed in U.S. Pat. No. 4,544,538, the entire disclosure of which is hereby incorporated by reference. Generally, SSZ-13 is a zeolite having a mole ratio of an oxide selected from silicon oxide, germanium oxide, and mixtures thereof to an oxide selected from aluminum oxide, gallium oxide, and mixtures thereof greater than about 5:1 and having the X-ray diffraction lines of Table 1 of U.S. Pat. No. 4,544,538. The zeolite further has a composition, as synthesized and in the anhydrous state, in terms of mole ratios of oxides as follows: (0.5 to 1.4) $R_2O$: (0 to 0.50) $M_2O$: $W_2O_3$: (greater than 5) $YO_2$ wherein M is an alkali metal cation, W is selected from aluminum, gallium, and mixtures thereof, Y is selected from silicon, germanium and mixtures thereof, and R is an organic cation. The organic R is removed typically by calcination at about 280–500° C. SSZ-13 zeolites can have a $YO_2$: $W_2O_3$ mole ratio greater than about 5:1. As prepared, the silica: alumina mole ratio is typically in the range of 8:1 to about 50:1. Higher mole ratios can be obtained by varying the relative ratios of reactants. Higher mole ratios can also be obtained by treating the zeolite with chelating agents or acids to extract aluminum from the zeolite lattice. The silica:alumina mole ratio can also be increased by using silicon and carbon halides and similar compounds. Preferably, SSZ-13 is an aluminosilicate in which W is aluminum and Y is silicon.

It is sometimes desirable to remove the alkali metal cation from SSZ-13 and to replace it with hydrogen, ammonium or other desired metal ion. Ion exchange can occur after the organic moiety R is removed, usually by calcination. The hydrogen and sodium forms of SSZ-13 can be used in this invention.

Description and method of preparation of the silicoaluminophosphate molecular sieves SAPO-34 and SAPO-44 are found in U.S. Pat. No. 4,440,871, which is hereby incorporated herein by reference. The structure of these molecular sieves is reported by Ashtekar et al., (Journal of Physical Chemistry, V98, N18, May 5, 1994, p. 4878) to be that of the CHA type. SAPO-34 is also identified as having a CHA type structure in the Journal of the American Chemical Society, 106, p. 6092–93 (1984).

The continuous phase of the mixed matrix membrane consists essentially of polymer. By "consists essentially of" is meant that the continuous phase, in addition to polymeric material, may include non-polymer materials that do not materially affect the basic and novel properties of this invention. For example, the continuous phase can include preferably small proportions of fillers, additives and process aids, such as surfactant residue used to promote dispersion of the molecular sieve in the polymer during fabrication of the membrane.

Preferably the polymeric continuous phase is nonporous. By "nonporous" is meant that the continuous phase is substantially free of dispersed cavities or pores through which components of the gas mixture could migrate. Transmembrane flux of the migrating components through the polymeric continuous phase is thus driven primarily by molecular solution/diffusion mechanisms. Therefore it is important that this polymer chosen for the continuous phase is permeable to the components to be separated from the gas mixture. Preferably the polymer is selectively gas permeable to the components, meaning that gases to be separated from each other permeate the membrane at different rates. That is, a highly permeable gas will travel through the continuous phase faster than will a less permeable gas. The selectivity of a gas permeable polymer is the ratio of the permeabilities of the pure component gases. Hence, the greater the difference between transmembrane fluxes of individual components, the larger will be the selectivity of a particular polymer.

Each molecular sieve to be used in the dispersed phase has particular separation characteristics of flux and selectivity with respect to the components of a given gas mixture. These characteristics are largely determined by such factors as the effective pore size and framework structure. The molecular sieve separation characteristics can be chosen to be different from those of the continuous phase polymer. Usually, the separation characteristics of the molecular sieve are selected so that overall separation performance through the mixed matrix membrane is enhanced relative to performance through a homogenous membrane of the continuous phase material. For example, a selectively gas permeable polymer might have a high flux but low selectivity in relation to a specific mixture of gases. A molecular sieve having high selectivity for the same gases can be dispersed in the continuous phase of such polymer to produce a mixed matrix membrane having a superior combination of selectivity and flux. Significantly, in many instances the CHA type molecular sieve can be chosen according to this invention to provide the mixed matrix membrane with overall enhanced flux and selectivity for a particular gas mixture in comparison to flux and selectivity obtained from many mixed matrix membranes utilizing non-CHA type molecular sieves.

The molecular sieve particle size should be small enough to provide a uniform dispersion of the particles in the suspension from which the mixed matrix membrane will be formed and also to obtain uniform distribution of the dispersed phase particles in :he continuous phase of the mixed matrix membrane. The median article size should be less than about 10 $\mu$m, preferably less than 3 $\mu$m, and more preferably less than 1 $\mu$m. Large agglomerates should be reduced to less than about 10 $\mu$m and preferably less than about 3 $\mu$m. Very fine molecular sieve particles may be made by various techniques such as by choosing appropriate synthesis conditions or by physical size reduction methods well known to those of ordinary skill in the art, such as ball milling, wet-milling and ultrasonication.

A diverse variety of polymers can be used for the continuous phase. Typical polymers suitable for the nonporous polymer of the continuous phase according to the invention include substituted or unsubstituted polymers and may be selected from polysiloxane, polycarbonates, silicone-containing polycarbonates, brominated polycarbonates, polysulfones, polyether sulfones, sulfonated polysulfones, sulfonated polyether sulfones, polyimides and aryl polyimides, polyether imides, polyketones, polyether ketones, polyamides including aryl polyamides, poly(esteramide-diisocyanate), polyamide/imides, polyolefins such as polyethylene, polypropylene, polybutylene, poly-4-methyl pentene, polyacetylenes, polytrimethysilylpropyne, fluorinated polymers such as those formed from tetrafluoroethylene and perfluorodioxoles, poly(styrenes), including styrene-containing copolymers such as acrylonitrile-styrene copolymers, styrene-butadiene copolymers and styrene-vinylbenzylhalide copolymers, cellulosic polymers, such as cellulose acetate-butyrate, cellulose propionate, ethyl cellulose, methyl cellulose, cellulose triacetate, and nitrocellulose, polyethers, poly(arylene oxides) such as poly(phenylene oxide) and poly(xylene oxide), polyurethanes, polyesters (including polyarylates), such as poly(ethylene terephthalate), and poly(phenylene terephthalate), poly(alkyl methacrylates), poly(acrylates), polysulfides, polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ketones), poly(vinyl ethers), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates), polyallyls, poly(benzobenzimidazole), polyhydrazides, polyoxadiazoles, polytriazoles: poly(benzimidazole), polycarbodiimides, polyphosphazines, and interpolymers, including block interpolymers containing repeating units from the above such as terpolymers of acrylonitrile-vinyl bromide-sodium salt of para-sulfophenylmethallyl ethers, and grafts and blends containing any of the foregoing. The polymer suitable for use in the continuous phase is intended to also encompass copolymers of two or more monomers utilized to obtain any of the homopolymers or copolymers named above. Typical substituents providing substituted polymers include halogens such as fluorine, chlorine and bromine, hydroxyl groups, lower alkyl groups, lower alkoxy groups, monocyclic aryl, lower acyl groups and the like.

Preferred polymers for the continuous phase are polysiloxane, polycarbonates, silicone-containing polycarbonates, brominated polycarbonates, polysulfones, polyether sulfones, sulfonated polysulfones, sulfonated polyether sulfones, polyimides, polyether imides, polyketones, polyether ketones, polyamides, polyamide/imides, polyolefins such as poly-4-methyl pentene, polyacetylenes such as polytrimethysilylpropyne, and fluoropolymers including fluorinated polymers and copolymers of fluorinated monomers such as fluorinated olefins and fluorodioxoles, and cellulosic polymers, such as cellulose diacetate and cellulose triacetate.

The selectively gas permeable membrane of this invention is formed by uniformly dispersing the CHA type molecular sieve in the continuous phase polymer. This can be accomplished by dissolving the polymer in a suitable solvent and then adding the molecular sieve, either directly as dry particulates or in a slurry to the liquid polymer solution. The slurry medium can be a solvent for the polymer which is either the same or different from that used in polymer solution. If the slurry medium is not a solvent for the polymer, it should be compatible (i.e., miscible) with the polymer solution solvent and it should be added in a sufficiently small amount that will not cause the polymer to precipitate from solution. Agitation and heat may be applied to dissolve the polymer more rapidly or to increase the solubility of the polymer in the solvent. The temperature of the polymer solvent should not be raised so high that the polymer or molecular sieve are adversely affected. Preferably solvent temperature during the dissolving step should be about 25–100° C.

The polymer solution should be agitated during and after addition of the molecular sieve to form a uniform suspension of the molecular sieve in the polymer solution. Also, the molecular sieve slurry should be agitated to maintain a substantially uniform dispersion prior to mixing the slurry with the polymer solution. Agitation called for by this process can employ any conventional high shear rate unit operation such as ultrasonic mixing, ball milling, mechanical stirring with an agitator and recirculating the solution or slurry at high flow through or around a containment vessel.

When a uniform dispersion of molecular sieve in polymer solution has been prepared, the membrane structure can be formed by conventional techniques such as depositing the suspension on a substrate and removing the solvent. By way of example, the suspension can be sprayed, cast with a doctor knife, or the substrate can be dipped into the suspension. Typical solvent removal techniques include ventilating the atmosphere above the forming membrane with a diluent gas and drawing a vacuum. Another solvent removal technique calls for immersing the dispersion in a non-solvent for the polymer which is miscible with the solvent of the polymer solution. Optionally, the atmosphere or non-solvent into which the dispersion is immersed and/or the substrate can be heated to facilitate removal of the solvent. When the membrane is substantially free of solvent, it can be detached from the substrate to form a self supporting structure or the membrane can be left in contact with a supportive substrate to form an integral composite assembly. In such a composite, preferably the substrate is porous or permeable to gaseous components which the membrane is intended to separate.

Further optional fabrication steps include washing the membrane in a bath of an appropriate liquid to extract residual solvent and other foreign matter from the membrane and drying the washed membrane to remove residual liquid.

The ratio of molecular sieve to polymer in the membrane can be within a broad range. Enough continuous phase should be present to maintain the integrity of the mixed matrix composite. For this reason, the polymer usually constitutes at least about 50 wt. percent of the molecular sieve plus polymer. It is desirable to maintain the respective concentration of polymer in solution and molecular sieve in suspension at values which render these materials free flowing and manageable for forming the membrane. Preferably the molecular sieve in the membrane should be about 5 weight parts per hundred weight parts ("pph") polymer to about 50 pph polymer, and more preferably about 10–30 pph polymer. Additional considerations for setting the desired proportion of molecular sieve to polymer within these general ranges are discussed further in the examples, below.

In one aspect of this invention, the molecular sieve can be bonded to the continuous phase polymer. The bond provides better adhesion and an interface substantially free of gaps between the molecular sieve particles and the polymer. Absence of gaps at the interface prevents mobile species migrating through the membrane from bypassing the molecular sieves or the polymer. This assures maximum selectivity and consistent performance among different samples of the same molecular sieve/polymer composition.

Bonding of the molecular sieve to the polymer utilizes a suitable binder such as a silane. Any material that effectively bonds the polymer to the surf ace of the molecular sieve should be suitable as a binder provided the material does not block or hinder migrating species from entering or leaving the pores. Preferably the binder is reactive with both of the molecular sieve and the polymer. The molecular sieve can be pretreated with the binder prior to mixing with the polymer for example by contacting the molecular sieve with a solution of a binder dissolved in an appropriate solvent. This step is sometimes referred to as "sizing" the molecular sieves. Such sizing typically involves heating and holding the molecular sieve dispersed in the binder solution for a duration effective to react the binder with silanol groups on the molecular sieve. Alternatively, the binder can be added to the dispersion of the molecular sieve in polymer solution. In such case the binder can be sized to the molecular sieve while also reacting the binder to the polymer. Bonding of the molecular sieve to the polymer is completed by reacting functional groups of the binder on the sized molecular sieve with the polymer. Monofunctional organosilicon compounds disclosed in copending U.S. patent application Ser. No. 09/960,194 titled Gas Separation Membrane with Organosilicon-Treated Molecular Sieves are preferred for use as binders. Representative of such monofunctional organosilicon compounds are 3-aminopropy. dimethylethoxy silane (APDMS), 3-isocyanatopropyl dimethylchlorosilane (ICDMS), 3-aminopropyl diisopropylethoxy silane (ADIPS) and mixtures thereof.

The solvent utilized for dissolving the polymer to form the suspension medium and for dispersing the molecular sieve in suspension is chosen primarily for its ability to completely dissolve the polymer and for ease of solvent removal in the membrane formation steps. Additional considerations in the selection of solvent include low toxicity, low corrosive activity, low environmental hazard potential, availability and cost. Representative solvents for use according to this invention include n-methylpyrrolidone, dimethyl acetamide, dioxane, toluene, acetone, and mixtures thereof Preferably, n-methylpyrrolidone or dimethyl acetamide can be used with continuous phase polymer comprising polyimide, toluene can be used with continuous phase polymer comprising polyvinyl acetate, and dioxane or acetone can be used with continuous phase polymer comprising cellulose acetate.

The novel mixed matrix membranes are effective to separate a component gas from a mixture of gases in which the molecules of the component gas have a kinetic diameter smaller or about the size of the characteristic channel dimension of the CHA type molecular sieves. Preferably, the channel size of these CHA molecular sieves is about 3–5 Å (0.3–0.5 nm). The kinetic diameters of the other gas molecules should be about the same size or larger than that of the component gas. For example these mixed matrix membranes with CHA type molecular sieves are well suited to separations of oxygen, carbon dioxide, helium or hydrogen, having kinetic diameters of 3.46 Å (0.346 nm), 3.3 Å (0.33 nm), 2.89 Å (0.289 nm) or 2.2 Å (0.22 nm), respectively, from nitrogen (3.64 Å, [0.364 nm]) or methane (3.8 Å[0.38 nm]).

EXAMPLES

This invention is now illustrated by examples of certain representative embodiments thereof, wherein all parts, proportions and percentages are by weight unless otherwise indicated. All units of weight and measure not originally obtained in SI units have been converted to SI units.

Example Materials

| | |
|---|---|
| SSZ-13 | A calcined aluminosilicate (Si/Al ratio of about 20–24) CHA type molecular sieve characterized by pores based on 8 member rings with about 3.8 × 3.8 Å (0.38 × 0.38 nm) dimensions which was prepared as disclosed in U.S. Pat. No. 4,544,538. |
| Zeolite KFI | An aluminosilicate molecular sieve of KFI type having channels based on 8 member rings with about 3.9 Å (0.39 nm) dimensions. |
| H-ZK-5 | Acid exchanged form of a KFI type molecular sieve having channels based on 8 member rings with about 3.9 Å (0.39 nm) dimensions with an approximate unit cell composition of $Si_{74.1}Al_{21.9}Na_{0.08}Cs_{1.72}O_{192}H_{20.1}$ determined by ICP analysis. |
| Zeolite 4A | Sodium exchanged aluminosilicate molecular sieve with LTA type structure having channels based on 8 member rings with about 4.1 Å (0.41 nm) dimensions. |
| Zeolite Rho | An aluminosilicate RHO type molecular sieve with an approximate unit cell composition of $Si_{39}Al_9O_{96}Na_{6.1}Cs_{4.5}$ by ICP. |

-continued

| | |
|---|---|
| Phillipsite | A PHI type molecular sieve with channels based on 8 member rings and dimensions of about 3.0–4.3 Å ( 0.30–0.43 nm). Composition parameters: Silicon to aluminum ratio 1.76, sodium to aluminum ratio 0.503 and potassium to aluminum ratio 0.659. |
| SAPO-34 | An aluminophosphate CHA type molecular sieve prepared using the procedure described in Robson, H., Microporous and Mesoporous Materials 1998, 22(4–6), 551–663. |
| SAPO-44 | An aluminophosphate CHA type molecular sieve prepared using the procedure described in Robson, H., Microporous and Mesoporous Materials 1998, 22(4–6), 551–663. |
| APDMS | 3-aminopropyldimethylethoxy silane |
| PVAc | polyvinyl acetate |

Examples 1–10

Membranes were formed from the following solution or suspensions.

Comparison Example 1

A 25% polymer solution free of molecular sieve was prepared by dissolving polyvinyl acetate (PVAc) in toluene. Ethanol was added to dilute the polymer concentration to 20%.

Comparison Example 2

A well-dispersed slurry of Zeolite 4A in ethanol was made by ultrasonication. The slurry was added to a 25% solution of PVAc in toluene and agitated by ultrasonication for 1 minute at 30–50° C. to thoroughly disperse the molecular sieve and maintain a uniform suspension of 20% polymer and 15 Zeolite 4A pph of polymer.

Comparison Example 3

Prepared the same as Comparative Example 2 except that the molecular sieve was H-ZK-5 in place of Zeolite 4A.

Comparison Examples 4–6

Suspensions were prepared similarly to Example 2 except that 20 pph polymer of molecular sieves KFI, Rho and Phillipsite was used in each respective suspension.

Example 8

The suspension for Example 8 was also prepared as in Example 2 but with 10 pph polymer of APDMS silane-treated CHA type zeolite SSZ-13 substituted as the molecular sieve. Silane treatment of the molecular sieve was accomplished as follows: SSZ-13 molecular sieve (5 g) was uniformly dispersed in 100 g of a solution of 2% solution of APDMS in 95/5 w/w ethanol/water using an ultrasonic horn. The dispersion was heated to 50° C. and head for 1.5 hours. The molecular sieve was recovered by filtering through a 0.2 micron polytetrafluoroethylene filter. The filter cake was washed three times in ethanol and then dried overnight at 110° C. under vacuum overnight.

Examples 9 and 10

Suspensions of 15 zeolite pph polymer were prepared by the same procedure as that of Comparative Example 2, except that CHA type molecular sieves SAPO-34 and SAPO-44, respectively, were substituted in place of Zeolite 4A.

Membranes were formed at ambient temperature by casting each solution or suspension on a flat polytetrafluoroethylene coated surface with a doctor knife set to a 100 μm gap. Residual solvent was evaporated under vacuum at 100° C. for 4–7 days to produce films. A sample of each film was tested in a permeation cell with single gases at 35° C. and 275–410 kPa (40–60 psi) pressure differential. Film permeability was calculated by the formula $$P = J\delta/(A\,\Delta p)$$

in which P is permeability in units of barrers ("B"), one barrer=$[10^{-10}\,cm^3\,(STP)\cdot cm/cm^2\cdot sec\cdot cm(Hg)]$, and J=rate of gas permeating the sample, $cm^3$/sec at standard temperature and pressure conditions, measured by pressure increase in a constant evacuated volume.

δ=membrane thickness, cm, measured by optical microscopy of film cross section.

A=sample area exposed to gas migration, $cm^2$, and

Δp=pressure differential, cm (Hg).

Selectivities were calculated as the ratio of permeabilities of selected gas pairs. The these measurements are presented in Table I.

TABLE I

| Example | zeolite to polymer pph | P (Barrers) | | | Selectivity | | |
|---|---|---|---|---|---|---|---|
| | | $O_2$ | $CO_2$ | He | $O_2/N_2$ | $CO_2/N_2$ | $He/N_2$ |
| 1 | 0 | 0.53 | 3.1 | 15.1 | 5.91 | 34.7 | 169 |
| 2 | 15 | 0.60 | 2.4 | 10.6 | 7.61 | 30.7 | 135 |
| 3 | 15 | 0.79 | 4.9 | 24.6 | 6.6 | 41.0 | 206 |
| 4 | 20 | 0.60 | 4.9 | | 6.5 | 53.6 | |
| 5 | 20 | 0.53 | | | 6.7 | | |
| 6 | 20 | 0.62 | | | 6.4 | | |
| 7 | 15 | 0.74 | 4.5 | 18.6 | 6.81 | 41.7 | 171 |
| 8 | 10 | 0.69 | 5.1 | 20.9 | 7.01 | 51.2 | 212 |
| 9 | 15 | 0.73 | 4.4 | 17.8 | 7.44 | 44.4 | 181 |
| 10 | 15 | 0.77 | 4.9 | | 8.08 | 51.8 | |

Membranes with high selectivity and permeability for $O_2$ and $CO_2$ are desirable as they allow efficient production of $N_2$ and $O_2$ enriched air from ambient air as well as purification of natural gas, landfill gas, biogas, etc. For mixed matrix membranes, it is useful to identify zeolites, which enhance selectivity and permeability for $O_2$ and $CO_2$ at relatively low ratio of molecular sieve to continuous phase polymer.

From the data in Table I the following can be seen:

1) All operative Examples 7–10 which utilized CHA type molecular sieves in mixed matrix membranes outperformed the polymer-only membrane, Ex. 1, in both flux and selectivity for $O_2$ and $CO_2$. Comparative Examples 3, 4 and 6 also yielded higher flux and selectivity relative to the polymer-only membrane. In comparative Examples 2 and 5 only one of these parameters improved over the polymer-only membrane.

2) Oxygen flux and selectivity: All operative Examples 7–10 provided both higher flux and selectivity than comparative Examples 4–6 which employed non-CHA type molecular sieves in mixed matrix membranes. Example 10 similarly outperformed comparative Example 2. Operative Examples 7–9 provided greater flux but not as high selectivity than comparative Example 2. All operative examples 7–10 demonstrated higher selectivity but slightly less flux than comparative Example 3.

3) Carbon dioxide flux and selectivity: $CO_2$ flux and selectivity through all operative Examples 7–10 were higher than comparative Example 2. Selectivity but not flux was better for the operative Examples 7, 9 and 10 than for comparative Example 3. Operative Example 8 was superior in both flux and selectivity to comparative Example 3 and was only slightly less selective than comparative Example 4. It is noted that Example 8 had one half less molecular sieve per weight unit of polymer than comparative Example 4 and thus is expected to have higher selectivity at equal loading to that comparative Example. Examples 7, 9 and 10 had poorer flux and selectivity than comparative Example 4. However, it is again observed that each of the operative sample mixed membranes utilized 25% less molecular sieve per weight unit polymer than did that comparative Example.

4) Helium flux and selectivity: CHA type molecular sieves with about 3.8 Å (0.38 nm) pore size would not have been expected to significantly improve the flux or selectivity of much smaller kinetic diameter migrating molecules such as helium (compare Exs. 7–9 to comparative Example 3). Nevertheless, Examples 7–9 demonstrate an enhancement in both parameters compared to the mixed matrix membrane used in comparative Example 2 as well as the polymer-only membrane of Comparative Example 1.

The permeability of a gas through the dispersed phase particle Pd may be calculated from the data of Table I utilizing a formula such as the following equation based on a model developed by Maxwell, in Treatise on Electricity and Magnetism, Vol. 1., published by Oxford University Press (1873):

$$Po = Pc[Pd + 2Pc - 2\Phi d(Pc - Pd)]/[Pd + 2Pc + \Phi d(Pc - Pd)]$$

in which

Po=overall permeability through the mixed matrix membrane

Pc=permeability through the continuous phase material (e.g., Example 1 data), and Φ=weight fraction of dispersed phase in mixed matrix membrane, i.e., weight molecular sieve divided by total weight of molecular sieve and continuous phase polymer in membrane.

Knowing the dispersed phase permeabilities with respect to pure component gases, it is then possible to use the immediately preceding equation or formulae based on other models to predict the optimum proportion of dispersed phase to continuous phase for a given set of mixed matrix membrane materials (i.e., molecular sieve and polymer) to achieve separations of the selected pure component gases.

Examples 11–13

Suspensions were prepared and films were cast according to the procedures of Example 2 to produce the following mixed matrix membranes having molecular sieve loading of 15 pph polymer: Comparative Examples 11. and 12 having non-CHA type molecular sieves zeolite 4A and KFI, respectively, and Example 13 having CHA type molecular sieve SSZ-13. A single comparative membrane for each of Examples 11 and 12 and three operative membranes for Example 13 were made and tested. Each membrane was tested for pure component oxygen and nitrogen permeability. Thereafter, each membrane was contacted for 18 hours with 206 kPa (30 psi) moist nitrogen (about 55% relative humidity) on one side while drawing vacuum on the other side. Then the humid nitrogen was removed and both sides of the membrane was subjected to vacuum of the operative sample mixed membranes utilized 25% less molecular sieve per weight unit polymer than did that comparative Example.

TABLE II

| Example | | Permeability $O_2$ Barrers | Selectivity $(O_2/N_2)$ |
|---|---|---|---|
| 11 | prior to humid $N_2$ contact | 0.52–0.62 | 7.5–7.7 |
|  | after humid $N_2$ contact | 0.42 | 5.6 |
| 12 | prior to humid $N_2$ contact | 0.56 | 6.3 |
|  | after humid $N_2$ contact | 0.48 | 6.0 |
| 13 | prior to humid $N_2$ contact | 0.71–0.78 | 6.7–6.9 |
|  | after humid $N_2$ contact |  |  |
|  | sample 1 | 0.74 | 6.5 |
|  | sample 2 | 0.75 | 6.7 |
|  | sample 3 | 0.72 | 6.8 |

Table II shows that mixed matrix membranes of conventional molecular sieves lost a significant fraction of their initial permeability and selectivity after contact with water vapor. In contrast, the CHA molecular sieve-containing mixed matrix membrane was largely unaffected by exposure to moisture after drying.

In the previous discussion of Examples 1–10, a potentially advantageous combination of higher flux and selectivity was observed for $CO_2$ by the non-CHA type molecular sieve mixed matrix membrane over CHA type mixed matrix membranes. Compare Table I, Ex. 4 to Ex. 7, 9 and 10. The data for $O_2$ of comparative Example 12 further suggest that the seemingly better performance from the non-CHA type molecular sieves is transient in moist environments. That is, in humid separation systems, separation performance of the non-CHA type membranes will deteriorate after exposure to water vapor present in the gases being separated. Thus the CHA type molecular sieve mixed matrix membranes should compare better to non-CHA type mixed matrix membranes in humid systems than has been presented in Examples 1 - 10.

Although specific forms of the invention have been selected for illustration and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A process for separating at least one component gas from a mixture comprising the component gas, the process comprising the steps of (A) providing a mixed matrix gas separation membrane comprising particles of CHA type molecular sieve dispersed in a continuous phase consisting essentially of a polymer which is permeable to the component gas, (B) contacting the mixture on one side of the membrane to cause the component gas to permeate the membrane, and (C) removing from the opposite side of the membrane a permeate gas composition comprising a portion of the component gas which permeated the membrane.

2. The process of claim 1 in which the component gas to be separated from the gas mixture has a kinetic diameter of about 2–5 Å (0.2–0.5 nm).

3. The process of claim 2 in which the component gas is oxygen.

4. The process of claim 2 in which the component gas is carbon dioxide.

5. The process of claim 1 in which the molecular sieve is selected from the group consisting of SSZ-13 aluminosilicate molecular sieve, SAPO-34 silicoaluminophosphate molecular sieve, SAPO-44 silicoaluminophosphate molecular sieve, and mixtures thereof.

6. The process of claim 5 in which the membrane comprises about 5–25 weight parts molecular sieve per 100 weight parts polymer and the polymer is selected from the group consisting of polysiloxane, polycarbonate, cellulosic polymer, silicone-containing polycarbonate, brominated polycarbonate, polysulfone, polyether sulfone, sulfonated polysulfone, sulfonated polyether sulfone, polyimide, polyether imide, polyketone, polyether ketone, polyamide, polyamide/imide, polyester, polyvinyl ester, polyolefin, polyacetylene, polytrimethysilylpropyne, fluorinated polymer and a mixture thereof.

7. A mixed matrix gas separation membrane comprising particles of CHA type molecular sieve dispersed in a continuous phase consisting essentially of a polymer.

8. The membrane of claim 7 in which the molecular sieve is selected from the group consisting of SSZ-13 aluminosilicate molecular sieve, SAPO-34 silicoaluminophosphate molecular sieve, SAPO-44 silicoaluminophosphate molecular sieve, and mixtures thereof.

9. The membrane of claim 8 in which the membrane comprises about 5–30 weight parts molecular sieve per 100 weight parts polymer.

10. The membrane of claim 8 in which the polymer is selected from the group consisting of polysiloxane, polycarbonate, silicone-containing polycarbonate, brominated polycarbonate, cellulosic polymer, polysulfone, polyether sulfone, sulfonated polysulfone, sulfonated polyether sulfone, polyimide, polyether imide, polyketone, polyether ketone, polyamide, polyamide/imide, polyester, polyvinyl ester, polyolefin, polyacetylene, fluorinated polymer and mixtures thereof.

11. The membrane of claim 8 in which the molecular sieve is SSZ-13.

* * * * *